Sept. 5, 1933.  F. GRAY  1,925,693
GLOW DISCHARGE LAMP
Filed June 30, 1926
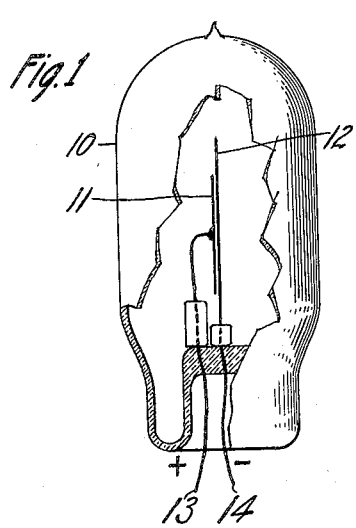
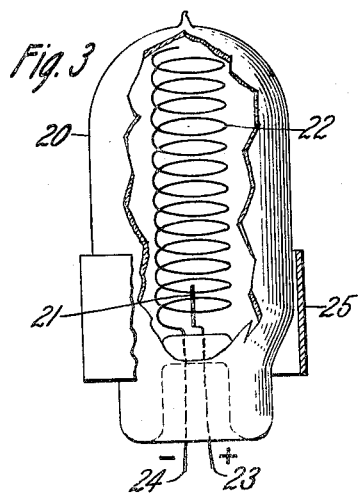
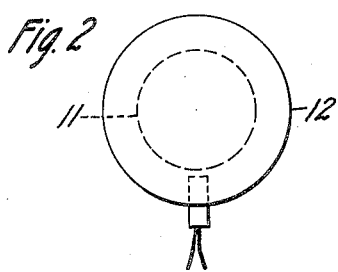
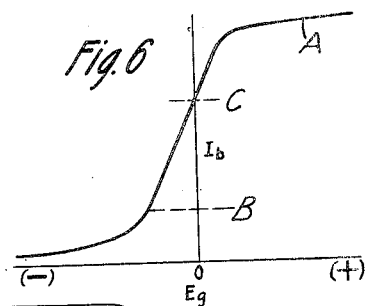
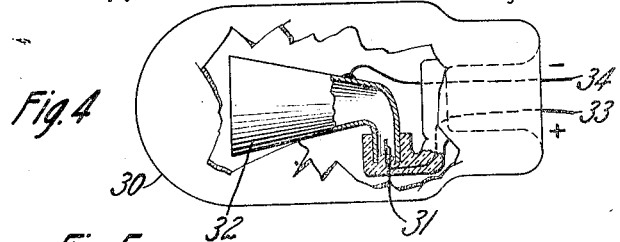
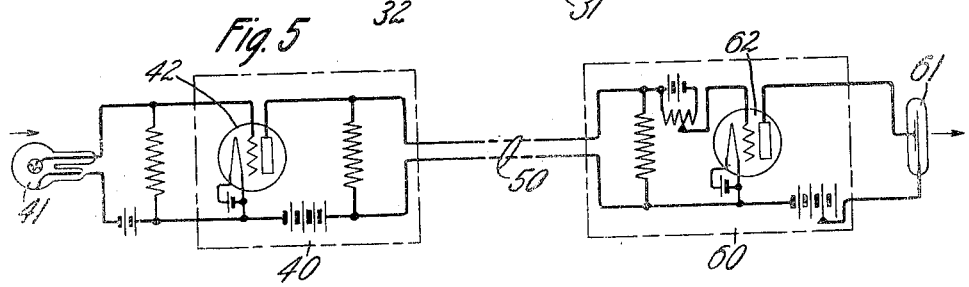
Inventor:
Frank Gray
by Joel C. L. Palmer Atty.

Patented Sept. 5, 1933

1,925,693

UNITED STATES PATENT OFFICE 1,925,693

GLOW DISCHARGE LAMP

Frank Gray, New York, N. Y., assignor to Bell Telephone Laboratories, Incorporated, New York, N. Y., a corporation of New York Application June 30, 1926. Serial No. 119,550

10 Claims. (Cl. 176—122)

This invention relates to glow discharge devices and particularly to those adapted for television reception.

The principal object of this invention is to improve the construction and operation of glow discharge devices and especially to eliminate the time lag frequently present in such devices and to control the amount of glow for different applied potentials.

In television and other systems having straight line characteristics, the receiving device should respond in accordance with the exciting stimulus from the transmitting end. If a space discharge amplifier or similar device is in the interconnecting circuit, its characteristic will be superimposed and unless operation is confined to the linear portion of its characteristic, distortion between the transmitting and receiving devices occurs. Space discharge amplifiers in a television circuit making direct interconnection may permit some current to reach the receiving lamp and in order to avoid distortion by such circuits the amplifiers are operated on the straight line portion of their characteristic which allows an appreciable current to pass when the object under observation by the television system actually appears black.

According to the present invention, therefore, there is provided a glow discharge device so designed that when such finite current passes through it, no illumination appears though the lamp is energized, and hence the received light may be controlled to truly represent the light of the object under observation at the transmitting station.

The desired result is accomplished by a special design of the discharge lamp which obscures the luminous discharge until the current passing therethrough has reached a predetermined value. The effective portion of the luminous discharge may be controlled either by properly designing the internal parts of the glow lamp or by interposing between the lamp and the observer a screen which obstructs the light until the lamp has reached a certain excitation when the glow spreads beyond the zone obstructed by the screen.

An advantage of this lamp is that it is always energized during operation and consequently avoids over-voltage and time lag in starting which might occur to some degree if it went out during operation. It is a direct method of securing the desired result.

Some of the general advantages of this invention have been broadly outlined above. Further advantages and objects will appear and a better understanding of the invention will be had from the following detailed description in connection with the accompanying drawing.

Fig. 1 is a side view of a glow discharge lamp.
Fig. 2 is a side view of the electrodes of Fig. 1.
Fig. 3 is a modified form of a glow discharge lamp.
Fig. 4 is another modified form of a glow discharge lamp.
Fig. 5 is a schematic circuit arrangement showing the essential elements interconnecting a photoelectric cell and a receiving glow discharge lamp.
Fig. 6 is a characteristic curve of a space discharge amplifier circuit such as is shown in Fig. 5.

Fig. 1 shows a glow discharge lamp in which the anode is somewhat smaller than the cathode. This form of lamp consists of a transparent bulb or container 10 filled with neon or other suitable gas or vapor at the proper pressure and two thin nickel or other suitable metal electrodes 11 and 12 mounted parallel and close to each other. The lead-in wires 13 and 14 are shielded within the tube by glass or other suitable insulating material to prevent glow discharge passing between them. When a difference in potential is applied across the electrodes, the smaller plate 11 being the anode and the larger plate 12 being the cathode, a glow takes place on the cathode at the edge of the anode and as the potential difference is increased the glow spreads until it reaches around and over the opposite or front side of the cathode 12. The separation between the plates is small and this together with the proper pressure of the surrounding gas, has the effect of preventing the discharge occurring between the plates and consequently no appreciable amount of glow is lost between them. These factors also control the glow voltage and the impedance of the lamp and the relationship of these factors may be made such that the glow voltage is substantially a minimum, and the effective impedance made to match that of the circuit in which it is used. The large cathode area of this general type of lamp decreases its effective resistance and thus increases the amount of radiation that is available for light production. Improvement in efficiency is obtained both by using relatively large area electrodes and placing them close together.

Fig. 2 is a side view of the electrodes 11 and 12, primarily showing that they are symmetrically positioned and that they have different areas.

The contour of the electrodes may be round, rectangular or any other suitable shape.

Fig. 3 is a modified design of a glow discharge lamp in which the initial illumination produced by the lamp is prevented from being observed by means of an external screen or shield.

The lamp consists of a transparent container 20 containing suitable gas, an anode 21, a cathode 22, lead-in wires 23 and 24 properly shielded within the tube and an exterior opaque screen or shield 25. The metal cathode 22 is shown in helical form extending longitudinally within the tube. The metal anode 21 extends a short distance within the tube. Upon a suitable difference in potential being impressed across the electrodes, a glow will occur and extend along the cathode for varying distances depending upon the potential difference.

The shield 25 may be a separate adjustable member either tubular or flat in form, or it may be a coating on or coloring of the lamp bulb adjusted or positioned longitudinally so that it cuts off the glow at any desired potential, thus making the lamp appear dark until the potential has reached a point where the glow has followed the cathode beyond the zone shielded by the screen 25.

Fig. 4 illustrates a different design of glow discharge lamp which appears dark until the applied differences in potential has reached a certain predetermined value. This lamp consists of a transparent envelope 30 containing suitable gas, an anode 31, a cathode 32 and positive and negative lead-in wires 33 and 34. The cathode 32 is a conical shaped metal electrode made of such material as nickel and at its smaller end it is bent so that the anode may enter it and not be seen when looking into it from the large end. The lead-in wire to the anode and the smaller end of the cathode are sealed in insulating material to prevent discharge occurring outside of the cathode.

In operation, when a difference in potential is impressed between the anode and the cathode, the glow commences at the smaller end of the cathode and, as the potential is increased, extends towards the larger end of the cathode. The bend at the smaller end of the cathode is such that a certain potential must be reached before the glow can be observed by looking into the larger end of the cathode and consequently the lamp appears dark until such potential has been reached.

Other specific geometric arrangements, electrodes of various metals including those strongly alkali such as potassium, sodium, lithium and the like, particularly for the cathode, and various gases at proper pressures may obviously be used in applying the principles of this invention. The efficiency, impedance, glow voltage, and light characteristics may all be thereby controlled.

Fig. 5 is a diagrammatic circuit arrangement showing a glow discharge lamp and an actuating device such as a photoelectric cell directly interconnected by vacuum tube amplifying devices.

A transmitting device such as a photoelectric cell usually passes feeble currents and therefore requires amplifiers interconnecting it with the receiving device. Also, if transmission occur over a long line, amplifiers may be required in connection with both the transmitting and the receiving device.

As earlier pointed out, such intervening devices may cause some current flow even when the transmitting device, such as a photoelectric cell, is exposed to a dark object. The glow discharge lamp of this invention makes it possible to utilize a transmission and amplifying system having the above mentioned characteristics.

In Fig. 5 the transmitting apparatus is generally shown at 40, the interconnecting line at 50 and the receiving apparatus at 60. The transmitting element is represented by a photoelectric cell 41 and the amplifier by a vacuum tube 42 and its circuits. The receiving element is represented by a glow discharge lamp 61 and the associated amplifier by a vacuum tube 62 and its circuits. The receiving element 61 may be similar to any of those shown and so designed and controlled that it appears dark when the transmitting element 41 is not transmitting current which should cause the appearance of light at the receiving end. It is obvious from this diagrammatic circuit arrangement that the proper adjustment may be made by means well known in the art.

Fig. 6 is a typical characteristic curve of an amplifying circuit such as that of a space discharge amplifier. The characteristic A is plotted to show plate or output current $I_b$ variation with grid voltage $E_g$ variation, the ordinate representing the former and the abscissa the latter. When in operation, the apparatus is adjusted to operate on the straight line portion of the curve preferably between B and C.

In a system such as schematically represented in Fig. 5 the glow discharge lamp 61 shows black until the plate current reaches the value indicated by B at the beginning of the straight portion of the characteristic, and the light emitted then becomes proportional to the current until it reaches a value beyond the straight portion of the characteristic. The circuit is free from distortion when operated on the straight portion of the characteristic and causes distortion when operated on the curved portion, either below or above the straight portion. A considerable part of the straight portion of the characteristic may be to the left of the ordinate and for this portion the grid voltage is negative, and it is preferable to operate with a grid variation having a negative voltage.

The invention disclosed herein is obviously susceptible to various modifications and adaptations without departing from the scope and spirit thereof and it is not intended to limit the invention to the specific construction herein shown and described except as defined by the scope of the appended claims.

What is claimed is:

1. A glow discharge lamp structure comprising a transparent housing, a glowable gas, positive and negative electrodes and also an opaque element positioned to obstruct the visibility of the glow until it has reached a given amount.

2. The combination with a glow discharge lamp for giving a visible indication in response to variations of current, of a source of current for continuously energizing said lamp to cause it to produce light, and means forming an element of the lamp structure for preventing the visibility of the glow of said lamp when the energizing current falls below a predetermined minimum.

3. The combination with an electrical circuit of a glow discharge lamp and a source of current in said circuit to cause said lamp to produce light, means forming an element of the lamp structure for varying the current from said source, and means for preventing the visibility of the glow of said lamp when the current in said circuit falls below a predetermined minimum.

4. The method of operating a glow discharge lamp, which comprises producing a luminous glow, obstructing light rays from the glow so that they do not reach a desired point, and increasing the voltage applied to the lamp to extend the region of the glow to permit the rays to reach the desired point.

5. The method of operating a signal glow lamp which comprises producing within the lamp a luminous glow the rays from which are prevented by the lamp structure from reaching a desired point, and increasing the signaling voltage applied to the lamp to extend the region of the glow to permit the rays to reach the desired point.

6. A signal glow discharge lamp comprising a transparent housing enclosing a glowable gas and positive and negative electrodes, and an opaque member constituting a part of said housing to obstruct the visibility of the glow until the latter has reached a given amount.

7. A signal glow discharge lamp comprising a transparent bulb enclosing a glowable gas, a hollow opaque inverted L-shaped electrode, and an electrode within the off-set portion of said first mentioned electrode.

8. A signal glow discharge lamp comprising a transparent bulb enclosing a glowable gas, a cone-shaped opaque electrode having its small end bent at an angle to the main portion thereof, and a second electrode adjacent said bent portion and cooperating therewith to set up a glow therein.

9. A signal glow discharge lamp comprising a transparent bulb enclosing a glowable gas and a cone-shaped opaque electrode having its small end at right angles to the main portion thereof, and a second electrode adjacent the right-angular portion of said first mentioned electrode and cooperating therewith to set up a glow therein.

10. The method of operating a signal glow discharge lamp comprising a housing enclosing a glowable gas and cooperating electrodes one of which is extended beyond the other, which comprises initiating between said electrodes a glow the rays from which are prevented by said extended electrode from reaching a desired point, and causing the glow to spread along said electrode to render the rays from said glow visible at the desired point.

FRANK GRAY.